Figure 1:
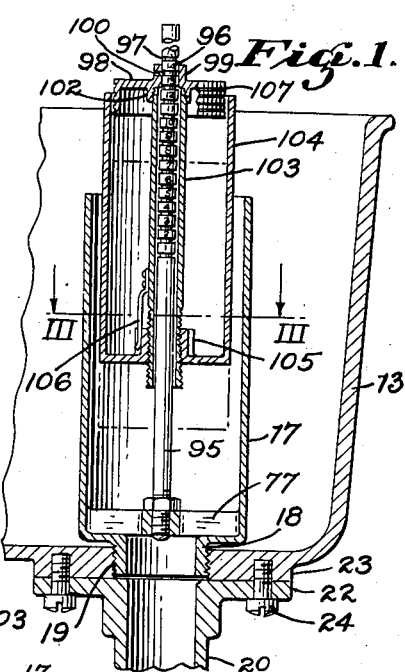
Figure 2:
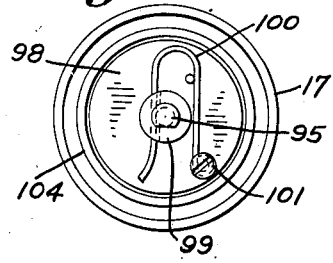
Figure 3:
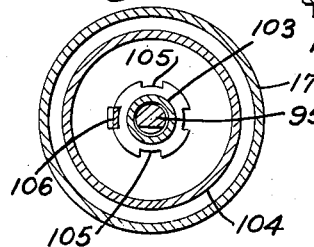

April 18, 1939.　　J. L. LAWRENCE　　2,155,317
MEASURING CUP
Filed July 30, 1935

INVENTOR.
JOSEPH L. LAWRENCE
BY Jas. M. Naylor
ATTORNEY.

Patented Apr. 18, 1939

2,155,317

UNITED STATES PATENT OFFICE 2,155,317

MEASURING CUP

Joseph L. Lawrence, San Francisco, Calif., assignor to Walter King, San Francisco, Calif.

Application July 30, 1935, Serial No. 33,864

7 Claims. (Cl. 73—165)

This invention pertains to measuring cups and particularly to measures of the type which are adapted to handle liquids.

It has been the increasing tendency of many governmental bodies, both federal and State, to lay down more exacting requirements as to the contents of packages of all kinds and this is especially true with respect to alcoholic beverages. Commendable as this policy undoubtedly is, because it insures that purchasers will get the full measurement called for, the more recent regulations have caused great expense and inconvenience in the industry for the simple reason that precision devices such as are required to comply with the laws have not been generally available for use. As a consequence of this, it has been observed that many persons vending bottled commodities have been obliged to resort to make-shift methods including the use of conventional measures and fillers followed by manual filling to the desired level.

These expensive practices have proved impracticable for the reason that the capacity of standard bottles is not uniform. This results from a variance in the processes of manufacturing glass containers and actual tests show that in a group of bottles of equal size, coming from the same factory, there will be a fluctuation in capacity ranging from a small to a large part of an ounce. Hence, the old practice of filling each bottle to a predetermined level has been found to violate, in many instances, a law providing that bottles of a certain size and marking must contain a specified number of ounces, no more and no less.

With this definite and pressing problem in mind, I set about the development of a cup which will measure a given quantity of fluid and then release that exact quantity to a bottle filling mechanism. That such is the accomplishment of my invention will become apparent from the following description and reference to the accompanying drawing.

Some of the principal virtues of my device lie in the fact that it is inexpensive to manufacture, easy to operate and adjust, and further, may be operated in small or large units with equal efficiency while utilizing its basic elements.

In the drawing:

Figure I is a sectional view of the measuring cup.

Figure II is a top plan view of a portion of the measuring cup shown in Figure I.

Figure III is a section taken along the line III—III of Figure I.

The measuring cups forming the subject matter of this invention, it will become more apparent as this specification proceeds, are for use in an apparatus wherein the fluid being handled is forced upwardly through a bottom way in the cup. Through the provision of valvular control the supply of fluid is cut off when the cups are filled and then, when the valve has been opened to discharge, the fluid flows through the bottom way or passage in the cup.

A measuring cup 17 having a reduced externally threaded butt 18 is seated within the reservoir 13, the threads of the butt portion engaging corresponding threads in the apertures 19 in the bottom thereof. A conduit or pipe 20 is secured to the bottom of the reservoir 13 by means of the screws 24 joining the conduit header flange 22 to the corresponding projection 23 on the reservoir. As illustrated in Figure I the passage in conduit 20 and the butt 18 are thus put in registry.

A post 95, screwed into the spider 77 at the bottom of the cup 17, is provided at its upper end with a scale 96. Numerals designating the ounces are applied to the face of the post and the latter is relieved therebetween, as at 97. Slidably mounted on the post 95, I provide a cap 98 with a slotted collar 99, adapted to engage the post 95 by means of the spring clip 100, secured to the top of the cap 98, as at 101, which fits into the relieved portions 97.

The cap 98 has an interiorly threaded socket 102 into which is threaded the elongated sleeve 103, and the latter is threaded at its lower end to engage the displacement member 104. A collar in the bottom of the member 104 has a series of vertical slots 105 adapted to receive a spring clip 106 secured to the sleeve member 103.

The cup 17, it will be understood, is filled and emptied through conduit 20, there being suitable valvular control of fluids therethrough. Such control means form no part of the present invention and hence are not shown.

Through the medium of the mechanism just described quick and accurate determination of the cubical content of the measuring cup 17 is accomplished by the following simple steps. The spring clip 100 is pulled outwardly free of the notches in the post 95 and the cap and the mechanisms dependent therefrom are raised or lowered to the desired level as indicated by the scale 96, whereupon the clip 100 is allowed to spring into engagement with the corresponding notch 97 on post 95. Finer adjustment to fractions of an ounce may be had by turning the displacement member 104 on the sleeve 103 according to the graduations 107 on cap 98, the clip 106 snapping from one slot 105 to the other as the member 104 is turned and serving to retain the latter in the desired position. The clip 106 further serves to provide a signal of the relative movement of member 104 since the snapping action can be distinctly felt by the operator.

While I have illustrated and described a preferred form of my invention it is to be appreciated that the principle of the same may take many additional forms, hence I do not wish to be limited this particular disclosure, and reference is had to the appended claims.

What I claim and desire to secure by grant of Letters Patent is:

1. In a bottle filling device, a measuring cup having a filling and discharge opening in the bottom thereof, a post seated in said cup, said post having a series of relieved portions at its upper end to form a scale, a rotatable member on said post adapted to engage said relieved portions, said rotatable member supporting a sleeve for said post, and a cylindrical displacement member carried by said sleeve and engaging threads on the latter, said rotatable and displacement members co-acting to determine the capacity of said cup.

2. In a bottle filling device, a measuring cup having a filling and discharge opening in the bottom thereof, a post seated in said cup, said post having a series of relieved portions at its upper end to form a scale, a rotatable member on said post, a yieldable member on said rotatable member normally engaging said relieved portions, a sleeve on said post dependent from said rotatable member, and a displacement member supported by said sleeve.

3. In a bottle filling device, a measuring cup having a filling and discharge opening in the bottom thereof, a post seated in said cup, said post having a series of relieved portions at its upper end to form a scale, a rotatable member on said post, said rotatable member including means for engagement with said relieved portions of said post and providing adjustment for said rotatable member, a sleeve on said post dependent from said rotatable member, and a displacement member supported by said sleeve.

4. In a bottle filling device, a measuring cup having a filling and discharge opening in the bottom thereof, a post seated in said cup, said post having a series of relieved portions at its upper end to form a scale, a rotatable member on said post, a spring clip on said rotatable member engaging a selected one of the relieved portions of said post, a sleeve on said post dependent from said rotatable member, and a displacement member supported by said sleeve.

5. In a bottle filling device, a measuring cup having a filling and discharge opening in the bottom thereof, a post seated in said cup, said post having a series of relieved portions at its upper end to form a scale, a rotatable member on said post, means on said rotatable member for engagement with relieved portions of said post, a sleeve on said post dependent from said rotatable member, a displacement member adjustably supported by said sleeve, and means on said sleeve and in said displacement member co-acting to retain the later in its adjusted position.

6. In a bottle filling device, a measuring cup having a filling and discharge opening in the bottom thereof, a post seated in said cup, said post having a series of relieved portions at its upper end to form a scale, a rotatable member on said post, means on said rotatable member for engagement with relieved portions of said post, a sleeve on said post dependent from said rotatable member, a displacement member adjustably supported by said sleeve, a collar in said displacement member, slots in said collar, and a spring member on said sleeve engaging one of said slots to retain the displacement member in its adjusted position.

7. In a bottle filling device, a measuring cup having a filling and discharge opening in the bottom thereof, a post seated in said cup, said post having a series of relieved portions at its upper end to form a scale, a rotatable member on said post, means on said rotatable member for engagement with relieved portions of said post, a sleeve on said post dependent from said rotatable member, a displacement member adjustably supported by said sleeve, a collar in said displacement member, slots in said collar, a spring member on said sleeve engaging one of said slots to retain the displacement member in its adjusted position, a secondary scale on the wall of said rotatable member, said secondary scale cooperating with the top of said displacement member to determine the adjustment thereof on said sleeve.

JOSEPH L. LAWRENCE.